Nov. 25, 1958
M. KRONENBERG
2,861,471
BALANCING DEVICE
Filed Aug. 27, 1956
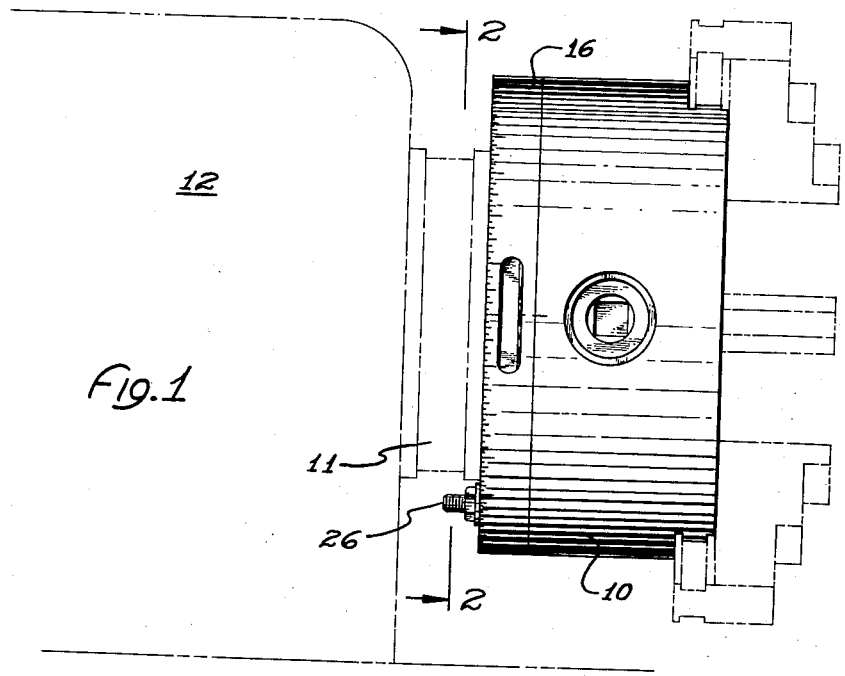
Fig.1
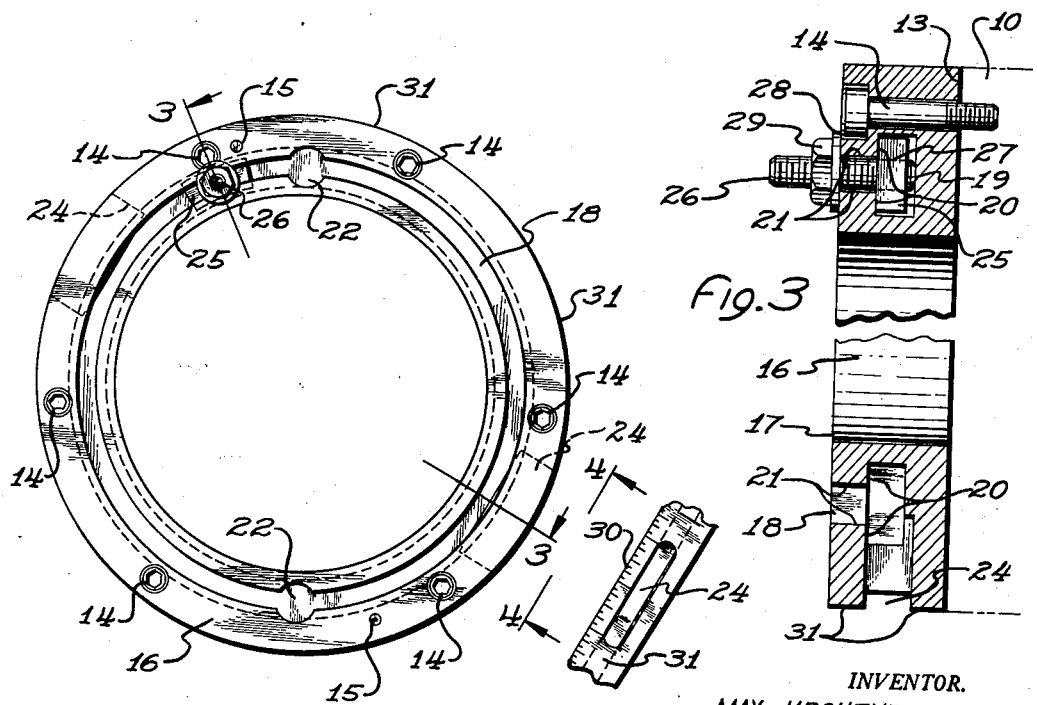
Fig.2
Fig.3
Fig.4
INVENTOR.
MAX KRONENBERG
BY
Willard S. Gowen
ATTORNEY.

United States Patent Office 2,861,471
Patented Nov. 25, 1958

2,861,471
BALANCING DEVICE

Max Kronenberg, Cincinnati, Ohio, assignor to The R. K. Le Blond Machine Tool Co., Cincinnati, Ohio, a corporation of Delaware Application August 27, 1956, Serial No. 606,278

2 Claims. (Cl. 74—573)

This invention is directed to improvements in balancing devices for machine tool spindles especially adapted to balancing chucks, face plates, and fixtures on such spindles.

In machine tools such as lathes utilizing present day high spindle speeds unbalance in the chucks and face plates becomes a problem due to the position of the scroll and jaws when adjustments are made therein for different sized work pieces. The moment of inertial of a chuck or face plate increases and the unbalance changes as the jaws are moved toward the outside of the chuck body to receive work pieces with large diameters. Such change in moment of inertial and/or unbalance can be duplicated each time when the same position of scroll and jaws is obtained. It is therefore found possible to compensate such unbalance in advance or whenever desired for each position of the jaws or speed of rotation of the chuck or face plate by shifting balance masses to a predetermined position which can readily be located by the operator when the chuck or face plate is equipped with a grooved and graduated ring to receive and locate the balance masses.

As an example, tests have shown that the headstock vibration of a lathe rotating at a spindle speed of 1000 R. P. M. can be minimized by shifting a balance weight of 39.1 grams to an angular position of 255° when the jaws comprise a circle of about 4" diameter. When the jaw positions are reduced to 3" diameter, the minimum amplitude of vibration at 1000 R. P. M. spindle speed was obtained by shifting the balance weight to a position of 305°.

No provisions for balancing are made in chucks and face plates available on the market today and hence none permits of balancing or presetting to the most favorable conditions. The unbalance in present day chucks and face plates which cannot be controlled by the operator generates oscillating forces and corresponding vibrations not only at the chuck or face plate or headstock itself but also at points remote from the chuck or face plate such as the carriage or tailstock. Vibrations generated in this way prevent the production of good surface finish on the workpiece when machined on a lathe or machine tool, and also affect the tool life adversely causing rapid wear and breakdown of the cutting tools and even the machine structure.

One of the objects of this invention is to provide a balancing device which prevents or minimizes the aforementioned vibrations and makes the setting of balance weights a simple repetitive matter of routine due to a novel graduated ring mounted on the chuck or face plate.

It is a further object to provide heavier or lighter weights in the same graduated ring as the circumstances require.

Still another object is to arrange the clamping means for the weights on the ring in such a manner that they may be positioned in any peripheral location while allowing radial insertion and withdrawal of the weights at diametrically opposite positions from the ring.

Another object is to provide in combination with a chuck or face plate, an integral or attached graduated ring to permit presetting and repetitive setting of balance weights to any desired angular position for the purpose of reducing or eliminating disturbing vibration in lathes, milling machines and other machines for chuck work.

And a further object is to provide a balancing ring on a chuck or face plate having radially disposed slots arranged on the periphery of the ring so that the balance weights may be introduced into a continuous clamping groove to permit positioning of said weight in any circumferential position on the ring.

Further features and advantages of this invention will appear from a detailed description of the drawings in which:

Fig. 1 is a side elevation of a chuck mounted on a lathe spindle and having the balancing ring incorporating the features of this invention.

Fig. 2 is a view indicated by the line 2—2 in Fig. 1.

Fig. 3 is an enlarged fragmentary sectional view on the line 3—3 of Fig. 2.

Fig. 4 is an enlarged fragmentary view indicated by the line 4—4 in Fig. 2.

As an example of one embodiment of this invention there is shown a regular three-jaw chuck 10 mounted on the spindle 11 of a lathe headstock 12. Fixed to the rear face 13 of the chuck 10 by suitable screws 14 and pins 15 is the balancing ring 16. In the rear face 17 of the ring 16 is formed an annular T-slot 18 having a bottom 19 and radially disposed clamping surfaces 20 and the annular groove defined by the sides 21. Diametrically oppositely disposed cutter clearance openings 22 are provided to insure proper initial balance of the ring 10.

At diametrically opposite points on the periphery 31 of the ring 10 are radially inwardly extending loading slots 24 which extend into the portion of the T-slot 18 between the bottom 19 and the clamping surfaces 20 so that balance weights 25 of desired size may be inserted therein. A threaded stud 26 is then screwed into the threaded bore 27 in the balance weight 25. A washer 28 and nut 29 is then tightened against the rear face 17 of the ring 10 to lock the weight 25 in any desired circumferential position. Preferably the stud 26 projects outwardly from the nut 29 to facilitate manipulation of the weights to desired location and the stud may be held between the fingers of one hand while tightening or loosening the nut 29 with the other.

A series of graduations 30 extending 360° around the periphery 31 of the ring 10 provides accurate reference means for precisely positioning the weight for correcting particular conditions of unbalance. The weights may be easily repositioned to different angular locations on the ring 10 to take care of various chuck openings, work pieces or jaw positions and can be easily repeated for the same conditions by having the graduations readily available for easy positioning of the weights. Thus, the chuck is always kept in proper balance for a large variety of working conditions with minimum of skill and effort being required to maintain desired balanced conditions. It is understood that the balancing ring may be made as an integral part of the chuck body as well as an attachable ring as described.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A chuck balancing device comprising a continuous annular ring having a continuous rear face, means to fix said rear face of said ring to the rear face of a chuck, a continuous annular T-slot in said ring having an annular groove facing rearwardly of the chuck, radially disposed loading slots opening in the periphery of said ring at diametrically opposite positions thereon, balance weights insertable radially into said T-slot through either of said loading slots while said ring is fixed to said chuck, stud means insertable through said annular groove to engage said weight, and clamping nut means on the outwardly projecting end of said stud to clamp said weight axially against the radially disposed surfaces of said T-slot in any circumferential position in said T-slot.

2. In a chuck balancing device as set forth in claim 1 wherein there is provided graduations around said annular groove for indicatively showing the annular positioning of said weight about the axis of rotation of the chuck.

References Cited in the file of this patent

UNITED STATES PATENTS

| | | |
|---|---|---|
| 79,984 | Jones | July 14, 1868 |
| 430,270 | Cook | June 17, 1890 |
| 1,218,689 | Nichols | Mar. 13, 1917 |
| 2,097,894 | Roche | Nov. 2, 1937 |
| 2,543,447 | Elrod | Feb. 27, 1951 |